Patented June 15, 1948

2,443,388

UNITED STATES PATENT OFFICE 2,443,388

PRODUCTION OF CHLORINE-CONTAINING PYRAN DERIVATIVES

Peter A. Hawkins, Widnes, and Nicholas Bennett, Ditton, England, assignors to Imperial Chemical Industries Limited, a corporation of Great Britain No Drawing. Application November 7, 1944, Serial No. 562,401. In Great Britain November 19, 1943

1 Claim. (Cl. 260—333)

This invention relates to the production of chlorinated organic compounds, and more particularly to the production of chlorine-containing pyran derivatives.

According to the present invention chlorine-containing pyran derivatives are obtained by a process which includes the step of reacting a hydropyran with chlorine.

One tetrahydropyran can be postulated on purely valence considerations, and is known, but while three dihydropyrans can be postulated on similar grounds only one of these is known, so far as we are aware, namely dihydro-γ-pyran. It will be understood, therefore, that in the present specification and claims a reference to a hydropyran means a reference to tetrahydropyran or dihydro-γ-pyran or to both of them as the context permits.

In carrying out the reaction between chlorine and tetrahydropyran chlorination be brought about by passing chlorine into the liquid tetrahydropyran while maintaining an elevated temperature. We find that at ordinary temperatures there is substantially no reaction between tetrahydropyran and chlorine and it is necessary to raise the temperature to at least 50° C., and suitably chlorination is carried out at a temperature between 50° C. and 70° C. Reaction then occurs with the evolution of heat, and it is therefore preferable to provide some means for removing the heat of reaction such as the use of a cooling coil immersed in the liquid, or an external cooling jacket, through which water, brine or other cooling liquid can be passed to maintain the liquid at a suitable temperature. It may also be advantageous to promote the reaction by the use of a chlorination catalyst such as ferric chloride, aluminium chloride, stannic chloride, antimony pentachloride or iron turnings. Actinic radiation such as the light from a mercury arc lamp or sunlight may also be used to facilitate the reaction. These means of promoting chlorination are more particularly valuable when it is desired to produce a highly chlorinated body, in particular a body containing at least 3 chlorine atoms per molecule.

In carrying out the reaction between dihydropyran and chlorine reaction occurs initially at ordinary temperatures with ease, and the presence of a catalyst is unnecessary; it is preferable to avoid catalysts especially if chlorination is carried out without a solvent, since they tend to induce the polymerization of any unconverted dihydropyran which may still be present, with the formation of unwanted tar-like or resinous masses.

Thus in one form of the invention chlorine is passed into dihydropyran while cooling the latter to a subatmospheric temperature at which it is still liquid. The chlorine may for example be passed in as rapidly as it is absorbed while cooling the solution to maintain it at approximately 0° C. At first absorption of chlorine proceeds without any evolution of hydrogen chloride, but after approximately 2 gram atoms of chlorine per gram molecule of dihydropyran have combined with the latter, the evolution of hydrogen chloride commences. At this stage the crude reaction product is an unstable liquid, which on heating at ordinary pressures evolves considerable quantities of hydrogen chloride.

By carrying out chlorination of the dihydropyran beyond the stage where 2 gram atoms of chlorine per gram molecule of dihydropyran have combined, the evolution of hydrogen chloride at reaction temperature commences, indicating that a substitution chlorination is proceeding. The process may be continued, for example, until more than 3 molecules of chlorine per molecule of dihydropyran have reacted; and it is then preferable to allow the temperature to rise to, for example, between 50° C. and 70° C. in order to induce reaction to occur at a convenient rate. It is also possible during these later stages of the chlorination to use a chlorination catalyst or to promote reaction with the aid of actinic radiation as described above in connection with the chlorination of tetrahydropyran.

In recovering the products of chlorination of either dihydropyran or tetrachlorohydropyran which have been prepared by chlorinating the hydropyran until at least 3 molecules of chlorine have reacted with the dihydropyran, the chlorinated material can be distilled in vacuo so as to obtain a number of fractions each of which may be further purified by further fractional distillation. In the case of the more highly chlorinated fractions a substantial amount of solid material may be deposited from them on standing which has the empirical composition of a tetrachlorotetrahydropyran, and this tetrachloro body may be separated by filtration and further purified by crystallization. It will be understood that the precise boiling range of the various fractions which are collected will depend on the manner in which the chlorination is conducted, and on the pressure at which fractional distillation is carried out. It will be found, however, that generally speaking, trichlorohydropyran fractions can be isolated which distil in the range 75° C. to 95° C. at 8 mm. pressure of mercury, while tetrachloro bodies can be obtained which distil in the range 100° C. to 120° C. at 4 mm. pressure of mercury. It is probable that each fraction so obtained comprises a mixture of isomers.

The chlorination of the hydropyran may be carried out in the presence of a solvent such as carbon tetrachloride by passing the chlorine into the hydropyran solution at ordinary or elevated temperatures as may be desired. Elevated temperatures are still necessary when tetrahydropyran is submitted to chlorination, while subatmospheric temperatures are to be preferred in treating dihydropyran, at least in the early stages.

In another form of our invention, instead of producing chlorinated hydropyrans containing at least 3 chlorine atoms per molecule, the 3-chloro-5,6-dihydropyran may be obtained by chlorinating either dihydropyran or tetrahydropyran until approximately 2 atoms of chlorine per molecule have combined with the hydropyran, and then submitting the product to distillation at ordinary pressures. Evolution of hydrogen chloride thereupon occurs with formation of the 3-chloro-5,6-dihydropyran which distils over. This chlorination may be conducted either in the presence or absence of a solvent, and where a solvent is used which has a low boiling point this may either be distilled off first at low temperature and pressure and the heating continued so as to cause hydrogen chloride to be evolved, or the solution may be heated at ordinary pressures so as to bring about the removal of hydrogen chloride and distil over the fraction comprising the 3-chloro-5,6-dihydropyran. The unsaturated monochloro body can also be produced by first heating under reflux the chlorination product containing approximately 2 gram atoms of chlorine per gram molecule; decomposition then occurs with the evolution of hydrogen chloride, leaving the unsaturated body which can be distilled off subsequently.

The monochlorodihydropyran obtained in this manner may usefully be employed in the production of other chlorine-containing pyran derivatives. Thus it may be reacted with chlorine either in the presence or absence of a solvent, whereby addition of chlorine occurs leading to the formation of a trichloro body or a body with an even higher proportion of chlorine. The trichloro body obtained by this manner appears to be identical with that obtained by continuing the chlorination of dihydropyran or tetrahydropyran up to the stage where 3 atoms of chlorine per molecule have combined with the hydropyran, and submitting the product to fractional distillation.

It is also possible to prepare a hydroxy derivative of a chlorinated hydropyran by treating the crude reaction product containing approximately 2 gram atoms of chlorine per molecule with water at ordinary temperature. Advantageously the reaction product is treated with water in the presence of an alkali metal carbonate such as sodium carbonate, or an alkaline earth metal carbonate such as calcium carbonate. Merely agitating a mixture of the reaction product with the aqueous suspension of calcium carbonate suffices to bring about reaction and as hydrolysis proceeds the hydrochloric acid released is neutralized and the reaction medium thus maintained neutral. The initially insoluble hydropyran derivative is converted chiefly to the corresponding hydroxyl-containing product which is soluble; a small proportion of an oily layer may also be formed. When no more of the insoluble derivative goes into solution it may be taken that reaction is complete, and the product may then be isolated from the aqueous layer by extraction with a water-immiscible solvent such as ethyl ether, followed by evaporation of the solvent from the extract. Small amounts of the ether compound $(C_5H_7ClO)_2O$ may also be obtained by submitting the oily layer which is formed to distillation in vacuo. Where the chlorination of the hydropyran has been conducted in the presence of a solvent such as carbon tetrachloride, the resultant solution may itself be treated with water in the above manner.

The following examples illustrate but do not limit the invention, all parts being parts by weight. In the analytical data in these examples the figure for the hydrolyzable chlorine was determined by boiling a given weight of the compound with water, and estimating the hydrochloric acid thereby formed.

Example 1

A solution of 252 parts of dihydropyran in 700 parts of carbon tetrachloride was cooled to 0° C. and chlorine was then passed in gradually while maintaining that temperature. When approximately 223 parts of chlorine had been introduced, traces of hydrochloric acid began to be evolved and the introduction of chlorine was stopped. The reaction product was then distilled at ordinary pressure. At first the solvent was driven off, and some evolution of hydrochloric acid gas occurred; as distillation continued, the evolution of hydrochloric acid gas became copious, and a stable, clear, mobile liquid distilled over at 141° C. to 142° C. 318 parts of this liquid were obtained containing 30.8% chlorine which could not be removed by hydrolysis with water. The formula $C_4H_7ClO$ requires 29.5% chlorine. The compound was thus deduced to be 3-chloro-5,6-dihydropyran. It had a specific gravity $D_4^{25}=1.180$ and a refractive index $n^{25}=1.479$.

Example 2

560 parts of the product obtained in Example 1 were submitted to chlorination by passing chlorine into the liquid at ordinary temperatures. When 240 parts of chlorine had been introduced hydrochloric acid gas began to be evolved and further introduction of chlorine was stopped. The product was then distilled at ordinary pressures. Some unchanged 3-chloro-5,6-dihydropyran distilled over at first, and then at 212° C. 820 parts of a stable liquid were obtained which solidified. On redistillation the solid boiled at 86° C./8 mm. giving a solid melting at 31° C. to 32° C. This solid contained 56% total chlorine of which 18.7% was hydrolyzable chlorine. The liquid did not react with bromine water. It was thus deduced to be 2,3,3-trichlorotetrahydropyran.

Example 3

500 parts of dihydropyran were dissolved in 1440 parts of carbon tetrachloride, and a small proportion of antimony pentachloride was then added. Chlorine was gradually passed into the solution, with cooling. Initially there was no evolution of hydrogen chloride, but when an increase in weight of the solution had occurred corresponding to the addition of 2 atoms of chlorine per molecule, hydrogen chloride began to be evolved. Chlorination was continued until a further increase in weight of the solution had occurred corresponding to the substitution of a further atom of chlorine for one atom of hydrogen.

The carbon tetrachloride was distilled off from the resulting solution at ordinary pressure, and the residual material was distilled through a packed column at a pressure of 20 mm. of mercury. 996 parts of product were thus obtained boiling in the range 120° C. to 155° C. On fractional distillation of this product at a pressure of 8 mm. of mercury the following fractions were obtained:

|   | Parts |
|---|---|
| 1. 58° C. to 65° C. | 88 |
| 2. 68° C. to 100° C. | 644 |
| 3. 100° C. to 110° C. | 291 |
| Residue | 160 |

Fraction 3 was partially solid; the solid part was filtered from the liquid portion, and twice crystallised from ethyl alcohol. It then melted at 110° C., boiled without decomposition at 240° C./760 mm. and at 114° C./4 mm. It contained 63.02% total chlorine, 31.25% of which was hydrolyzable chlorine. The compound was not attacked by alcoholic potash. It was deduced to be 2,2,3,3-tetrachlorotetrahydropyran.

On redistilling fraction 2 at 8 mm. pressure, the following fractions were obtained:

|   | Parts |
|---|---|
| 1. 80° C. | 60 |
| 2. 80° C. to 90° C. | 338 |
| 3. 90° C. to 95° C. | 53.6 |
| Residue | 8.2 |

Most of fraction 2 distilled between 83° C. and 87° C./8 mm. and boiled at 190° C. to 210° C. at atmospheric pressure without decomposition; it contained 55.2% total chlorine and 19.4% hydrolyzable chlorine. The compound was thus essentially trichlorotetrahydropyran, comprising chiefly the 2,3,3 isomer produced in Example 2.

*Example 4*

Chlorine was passed gradually into 517 parts of tetrahydropyran warmed to 70 C. initially and cooled after chlorination had commenced to maintain the temperature between 65° C. and 70° C. Hydrogen chloride was evolved during this chlorination. When the increase in weight of the material was 550 parts corresponding approximately to the combination with the tetrahydropyran of 3 atoms of chlorine per molecule, chlorination was stopped. The product was then distilled in vacuo. A small amount of hydrochloric acid was evolved during the distillation and fractions were obtained as follows:

|   | Parts |
|---|---|
| 1. Up to 100° C./22mm. (chiefly 95° C.–99° C./22 mm.) | 124 |
| 2. 100° C.–110° C./22 mm. (chiefly 105° C.–106° C./22 mm.) | 630 |
| 3. 110° C.–140° C./22 mm. (chiefly 130° C.–135° C./22 mm.) | 154 |
| Residue | 96 |

Fraction 2 had a specific gravity $D_4^{29}$ of 1.41 and was essentially trichlorotetrahydropyran containing 18.7% hydrolyzable chlorine. On distillation at atmospheric pressure partial decomposition occurred with evolution of hydrogen chloride. It was thus deduced that it was a mixture of 2,3,3-trichlorotetrahydropyran and 2,3,5-trichlorotetrahydropyran, the former of which is stable on distillation at atmospheric temperature, while the latter decomposes under such conditions to give 3,5-dichlorodihydropyran.

Fraction 4 deposited crystals on standing which were filtered off and washed with ethyl alcohol. They melted at 107° C. to 108° C.; a mixed melting point test indicated that the compound was identical with the 2,2,3,3-tetrachlorotetrahydropyran obtained in Example 3.

*Example 5*

155 parts of the crude reaction product obtained by chlorinating dihydropyran at 0° C. until 2 atoms of chlorine per molecule had been absorbed were agitated for 10 hours with 500 parts of water in which 50 parts of calcium carbonate were suspended. At the end of that time most of the reaction product had gone into solution, but a small amount of an oily layer remained. The aqueous layer was filtered and then extracted 3 times with 50 parts of ethyl ether, and the ether was evaporated from the combined extracts. A viscous pale brown liquid was thus obtained which on cooling gave a mass of white crystals weighing 50 parts. The crystals were soluble in water, ethyl alcohol, and ethyl ether, were dextro rotatory, melted at 64° C. and contained 27.4% chlorine. $C_5H_7O_2Cl$ requires 26.4% chlorine. It was deduced that the compound was

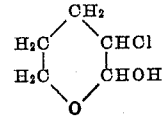

On distilling the oily layer in vacuo a small amount of white crystals were obtained melting at 107° C. containing 29% chlorine, and having a molecular weight of 257. $C_{10}H_{16}Cl_2O_3$ contains 27.8% chlorine and has a molecular weight of 255. This second product was thus shown to be

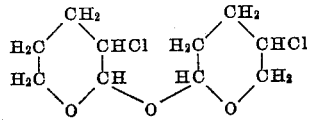

We claim:

Process for the production of trichlorotetrahydropyran which comprises reacting a hydropyran having solely hydrogen as substituents with chlorine until 3 atoms of chlorine per mole have combined with said hydropyran, subjecting the reaction products to fractional distillation and isolating a fraction boiling within the range 75° to 95° C. at 8 mm. pressure of mercury.

PETER A. HAWKINS.
NICHOLAS BENNETT.

REFERENCES CITED

The following references are of record in the file of this patent:
Chemical Abstracts, vol. 20 (1926), page 1624.
Compte Rend. 198, pages 375–6 (1934).
Bull. Soc. Chimique (5), 1, pages 1397–1405 (1934).